United States Patent Office 2,744,238
Patented May 1, 1956

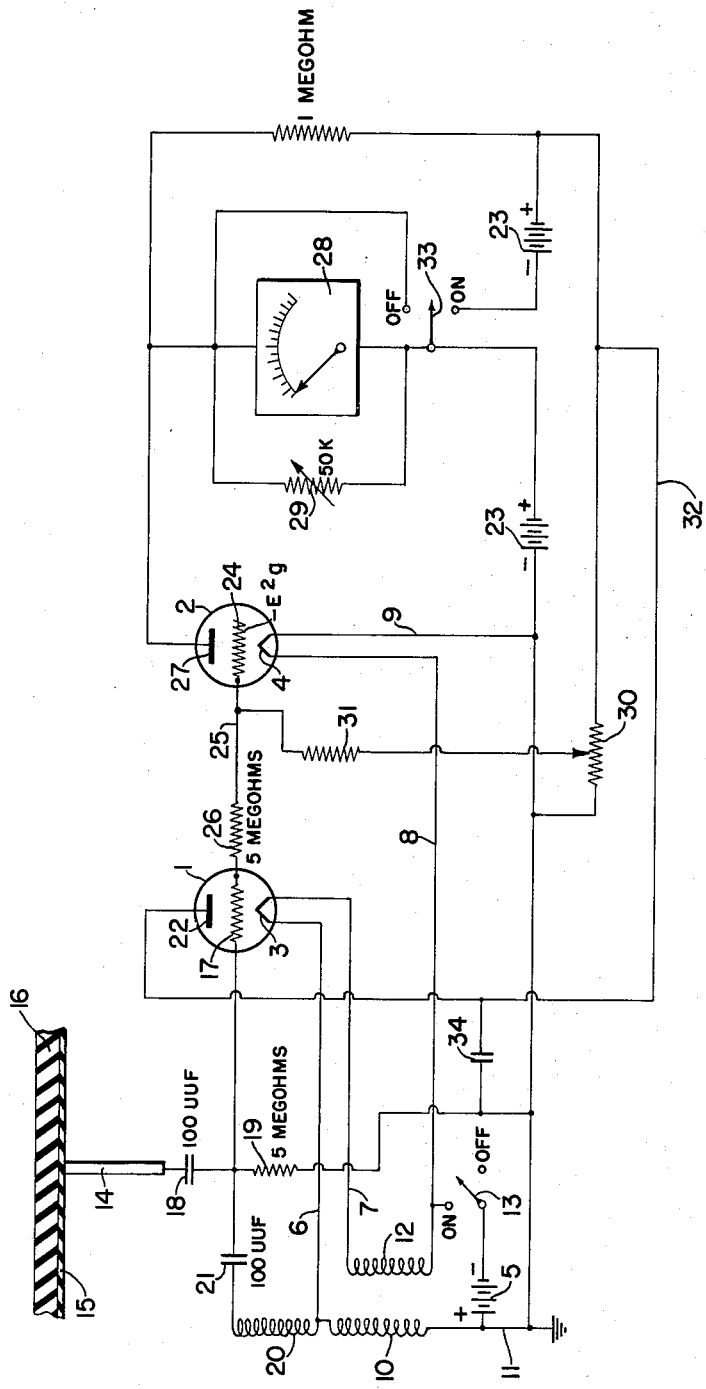

2,744,238

ELECTRONIC THICKNESS GAUGE

Gilbert J. C. Andresen, Stow, Ohio, assignor, by mesne assignments, to The Goodyear Tire & Rubber Company, a corporation of Ohio Application April 22, 1953, Serial No. 350,465

4 Claims. (Cl. 324—61)

This invention relates to electronic thickness gauges, and particularly to single electrode type gauges especially adapted for use in measuring the thickness, or thinness, of the first ply or lamina of laminated articles, such as a tire, or a gasoline fuel cell, as is used in aircraft.

Heretofore there has been appreciable work done in the provision of electronic thickness gauges using capacitance variations in a tested article for measuring thickness. Such gauges have usually included two electrode plates positioned so that the material to be measured can be placed between the electrode plates and the variations in capacitance of the material, normally produced by thickness variations, are measured on a meter that can be calibrated to read the capacitance variations in terms of thickness variations. However, with some articles it is difficult to place two electrodes into association with the material to be measured, whereas with still other articles made from laminations of materials, the two electrode system of measurement is not very satisfactory for measuring variations in the first layer of the laminated structure. This is especially true if the dielectric properties of different laminations vary widely.

In fuel cells, it is particularly important that the first or the inner ply of the fuel cell be of uniform thickness as such inner ply usually is made from special material for contacting the gasoline or other fuel in the fuel cell and for preventing leakage of the fuel into contact with any of the other plies of the fuel cell or tank. The invention will be described with reference to the testing of the inner ply of a fuel cell.

In a fuel cell, the capacitance of the inner ply of the wall is normally relatively large with relation to the capacitance of the remaining plies of the fuel cell wall and since the capacitance of the entire fuel cell wall equals the capacitance of the inner fuel cell ply times the capacitance of the remainder of the fuel cell wall divided by the sum of capacitances of the two laminations, the variation in capacitance of the inner fuel cell ply, which is that to be measured by the gauge of the invention, would produce only relatively small variations in the total capacitance of the fuel cell wall. Hence, a conventional two electrode gauge would not be accurate in measuring the inner wall thickness as the total capacitance is more responsive to variations in the thickness (dielectric effect and capacitance) of the remaining plies in the cell wall.

A new approach to the measurement of the inner ply's capacitance must be made to have the capacitance of the inner ply be that primarily measured by the gauge used. Use of a single probe electrode with a small contact area on the inner ply has been found to give the desired measurement action. Such a result is secured because the probe electrode used with the gauge of the invention is brought into direct contact with a small area of the inner ply of the fuel cell and the small contact area has a very small capacitance the value of which is primarily determined by the proximal dielectric constants of and the amount of material it contacts. The dielectric effects of the material distal to the probe is that of a very large capacitance in series with the small probe capacitance and the earth. The effects of materials or bodies between the fuel cell and the earth can be avoided by the use of an electric grounded shielding material, such as metallic cloth, which usually is placed over the outside surface of the fuel cell being tested.

One electronic thickness gauge somewhat similar to that of the present invention is shown in Patent No. 2,601,649. Such patented gauge was particularly developed for use in testing the thickness of glass walls of a container wherein no electrode normally could be positioned within the container and the capacitance of the the container wall was measured by a probe electrode contacting the outer surface of the container. The gauge in such patent uses an ocillator tube circuit wherein the probe capacitance variation alters the plate current in the oscillator tube and uses such plate current variation to measure or indicate the thickness of the wall of the container being gauged. The patented gauge uses a highly sensitive frequency selective circuit that is responsive to the probe capacitance.

By use of a frequency selective circuit, certain resonant frequency problems arise which make it difficult for the control circuit to be tuned, and make the system dependent upon critical resonant circuits.

The general object of the present invention is to provide a novel electronic thickness gauge which is characterized by its operation without the use of frequency responsive characteristics in the control circuit.

Another object of the invention is to use a second electron tube in combination with a high frequency electron oscillator, wherein the probe capacitance changes are transmitted via the oscillator or grid voltage changes acting for control of the plate current of the second electron tube so that such plate current actuates a meter to indicate the inner ply thickness of the article being gauged.

The foregoing and other objects and advantages of the invention will be made more apparent as the specification proceeds.

For a better understanding of the present invention, reference should be had to the accompanying drawing which illustrates one current preferred embodiment of the principles of the present invention and wherein a circuit for the electronic thickness gauge of the invention is shown.

The electronic gauge of the invention generally comprises a single electrode probe, an electron tube oscillator for supplying high frequency energy to the electrode probe, and a second electron tube responsive to the probe electrode capacitance and with the grid of the second electron tube responding to the voltage on the grid of the oscillator tube as a function of the dielectric effect (thickness) of the inner ply.

The plate of the second tube is connected to a conventional metering means and the plate current is measured, or calibrated, to indicate the gauge or thickness of the material contacted by the electrode probe.

In order to simplify comparison between the drawing and the specification, corresponding numerals are used in both the drawing and the specification for referring to corresponding parts.

The electronic thickness gauge of the invention primarily includes a pair of triodes 1 and 2 with filaments 3 and 4, respectively, positioned therein and connected to a suitable battery 5 through leads 6 and 7, and 8 and 9, respectively. The lead 6 connects to an inductance coil 10 which is grounded by a lead 11 and with one terminal of the battery 5 connecting to such lead 11. The opposite side of the battery 5 connects to lead 7 through a suitable inductance coil 12 and a conventional control switch 13 used for turning the gauge of the invention on and off.

The gauge of the invention, as indicated hereinbefore, is for use particularly in measuring the dielectric properties of the material in proximity or contact with a single electrode probe 14 connected to the remainder of the gauge. The circuit associated with the probe 14 is shielded from external electrical forces in any conventional manner. This probe 14 is shown in contact with an inner ply 15 of a laminated structure, such as a fuel cell wall and with the remainder of such wall being shown as an integral layer and indicated by the numeral 16. The probe 14 connects to a grid 17 of the high frequency voltage supply tube 1 through a fixed value condenser 18, while the grid 17 of the tube 1 is grounded through a fixed resistance 19. An inductance coil 20 connects to the coil 10 at one end thereof and with the opposite end of such inductance coil 20 connecting through a condenser 21 to the probe circuit. Plate 22 of the tube 1 connects to a multi-cell battery 23 in the power supply circuit of the invention, as hereinafter explained.

Variations in the capacitance of the inner ply 15 of material being tested will vary the current flow through the resistance 19 and the potential of both the grid 17 of the tube 1 and a grid 24 of the tube 2. The grid 24 is connected to the grid 17 by lead 25 in which a resistance 26 is connected. Varying current thus flows from a plate 27 of the tube 2 to one terminal of an indicating meter 28 provided in the gauge. Actually, the grid 24 of the tube 2 is connected in shunt to the tube 1, and thus variations in the probe capacitance shunt proportional amounts of the high frequency voltage from the tube 2 to effect the level of the D. C. control voltage on the grid 24. A variable resistance 29 is connected across the terminals of the meter 28 for varying the sensitivity and range of the meter 28, whereas a resistance 30 is adjustably connected to the grid 24 through a fixed high value resistance 31 to adjust the grid voltage $-E^2g$ on grid 24 to its optimum operating range, and control the zero adjustment of the meter. Lead 32 connects the plate 22 to the power supply battery 23. Switch 33 also is closed to render the apparatus operative.

The plate circuit of the tube 1 usually is grounded through a condenser 34.

It will be realized that the specific types of tubes 1 and 2 used in the practice of the invention may be varied widely, as desired, and the circuit be modified to the other tube, in order to select the optimum operating parameters for the tubes to adapt the tubes individually to the separate services performed in the measuring system by the different tubes. For example, a tube with a cathode therein may be substituted for the tube 2, and a cathode voltage can be provided to control the effective voltage of the grid 24. The resistance 26 could then be omitted, as could the resistance 31 and the lead in which it is connected and the power loss of the resistances in the circuit of the grid 24 would be avoided.

From the foregoing, it will be seen that a two electron tube thickness gauge has been provided wherein the voltage reading means is substantially separate from the sensing means used for measuring the dielectric effect of the article positioned proximal to the single electrode probe of the thickness gauge. The control circuits used are relatively uncomplicated and require only a minimum amount of adjustment for reading any desired information, such as dielectric effect or ply thickness directly on the meter provided in the apparatus.

Typical examples of the values of the various complements of the circuit of the invention are that the condensers 18 and 21 both have a capacitance of 100 μμf. whereas the resistances 19 and 26 have resistances of 5 megohms, and the range setting resistance 29 has resistance of 50 K ohms.

Any conventional switches are used in the apparatus, whereas the battery means provided are of conventional construction and voltages.

As indicated hereinbefore, usually it is desirable to place some electrical shield on the exposed surface of the wall 16 and ground such shield to avoid interference with the gauge of the invention by variable external electrical forces.

It should be noted that the apparatus of the invention is responsive to effects that change the capacitance of the probe and that use of the apparatus is not limited to effects indicating thickness so that the apparatus may be used for other purposes than that specifically described. Also, the indicator means may be a relay, for example, rather than the meter 28 operated by the current flowing from the plate 27. Such relay could perform any desired recording, or indicating or other action, as desired.

From the foregoing, it will be seen that a relatively uncomplicated gauge of desirable operating properties has been provided, and that the objects of the invention have been achieved.

While certain representative embodiments and details have been shown for the purpose of illustrating the invention, it will be apparent to those skilled in this art that various changes and modifications may be made therein without departing from the spirit or scope of the invention.

I claim:

1. An electron gauge for indicating the dielectric property of a material proximal to a single probe electrode of the gauge, which gauge comprises a probe electrode, an electron tube oscillator supplying high frequency electrical energy to said probe electrode, said oscillator including an oscillator triode having a control grid capacitatively coupled to said probe electrode, and a second electron tube having a control grid directly coupled to the control grid of said oscillator triode and having adjustable grid biasing means connected thereto to adjust its operating potential, said control grid of said second electron tube being responsive to the dielectric effect of said probe electrode, whereby the plate current of said second electron tube is a measure of the dielectric effect of a material contacting said probe electrode.

2. A gauge as in claim 1 wherein the grid of said second tube connects to said probe electrode through a resistance connected to the grid of said oscillator tube.

3. A gauge as in claim 2, wherein the adjustable grid biasing means for regulating and adjusting resistance is connected intermediate the said grids of said tubes to vary the operative range of grid voltage of said second electrode tube.

4. An electronic thickness gauge for indicating the dielectric property of a material proximal to a probe of the gauge, which gauge comprises an electrode probe having a small contact area, an electron tube oscillator supplying high frequency electrical energy to said electrode probe and having its grid connected to said probe, a second electron tube having a control grid directly connected to the grid of said tube oscillator through a high resistance and responsive to the dielectric effect of said probe electrode, the plate current of said second electron tube being a measure of the dielectric effect of a material contacting said electrode probe, means for controlling the effective voltage of said grid of said second electron tube, the last said means comprising a potentiometer spanning a source of potential and an indicating meter connected to said plate of said second electron tube.

References Cited in the file of this patent

UNITED STATES PATENTS

| | | |
|---|---|---|
| 2,518,045 | May | Aug. 8, 1950 |
| 2,601,649 | Wadman | June 24, 1952 |
| 2,654,864 | Tuck | Oct. 6, 1953 |